United States Patent [19]
Sprague et al.

[11] 3,877,788
[45] Apr. 15, 1975

[54] METHOD AND APPARATUS FOR TESTING LENSES

[75] Inventors: Robert A. Sprague, North Chelmsford; John A. O'Brien, Reading, both of Mass.

[73] Assignee: Itek Corporation, Lexington, Mass.

[22] Filed: Mar. 30, 1973

[21] Appl. No.: 346,366

[52] U.S. Cl. ................. 356/124; 356/125; 356/167
[51] Int. Cl. ........................ G01b 9/00; G01b 11/00
[58] Field of Search ............ 351/1, 10, 11; 356/124, 356/128, 125, 126, 237, 160, 158, 167, 239

[56] References Cited
UNITED STATES PATENTS

| | | | |
|---|---|---|---|
| 1,339,031 | 5/1920 | Laabs................................. | 356/125 |
| 1,988,169 | 1/1935 | Duckwall............................ | 356/239 |
| 2,329,907 | 9/1943 | Jobe et al. ............................ | 351/11 |
| 3,427,110 | 2/1969 | Mansour.............................. | 356/239 |
| 3,536,383 | 10/1970 | Cornsweet et al................... | 351/16 |
| 3,573,849 | 4/1971 | Herriot et al. .......................... | 350/7 |
| 3,639,041 | 2/1972 | Cornsweet............................. | 351/7 |
| 3,715,166 | 2/1973 | Leighty et al....................... | 356/125 |

OTHER PUBLICATIONS
T. N. J. Archard et al., Optical Scanning and Recording System for a Photoelectric Optical Bench, Electronic Engineering, May 1957, pp. 231–233.

Primary Examiner—Ronald L. Wibert
Assistant Examiner—Conrad Clark
Attorney, Agent, or Firm—Homer O. Blair; Robert L. Nathans; Gerald H. Glanzman

[57] ABSTRACT

Method and apparatus for performing a variety of tests on opthalmic lenses. The apparatus includes structure for directing a very narrow beam of light through one or more selected areas of the lens under test and then electronically examining the degree in which the light beam is deflected as a result of passing through the lens areas. By the inclusion of appropriate structure, this information is then utilized to automatically measure a variety of lens characteristics such as the segment add power of a bifocal lens, the dimensions of a bifocal segment, and the like. The apparatus permits these tests to be carried out accurately, rapidly and with a minimum of operator supervision.

20 Claims, 2 Drawing Figures

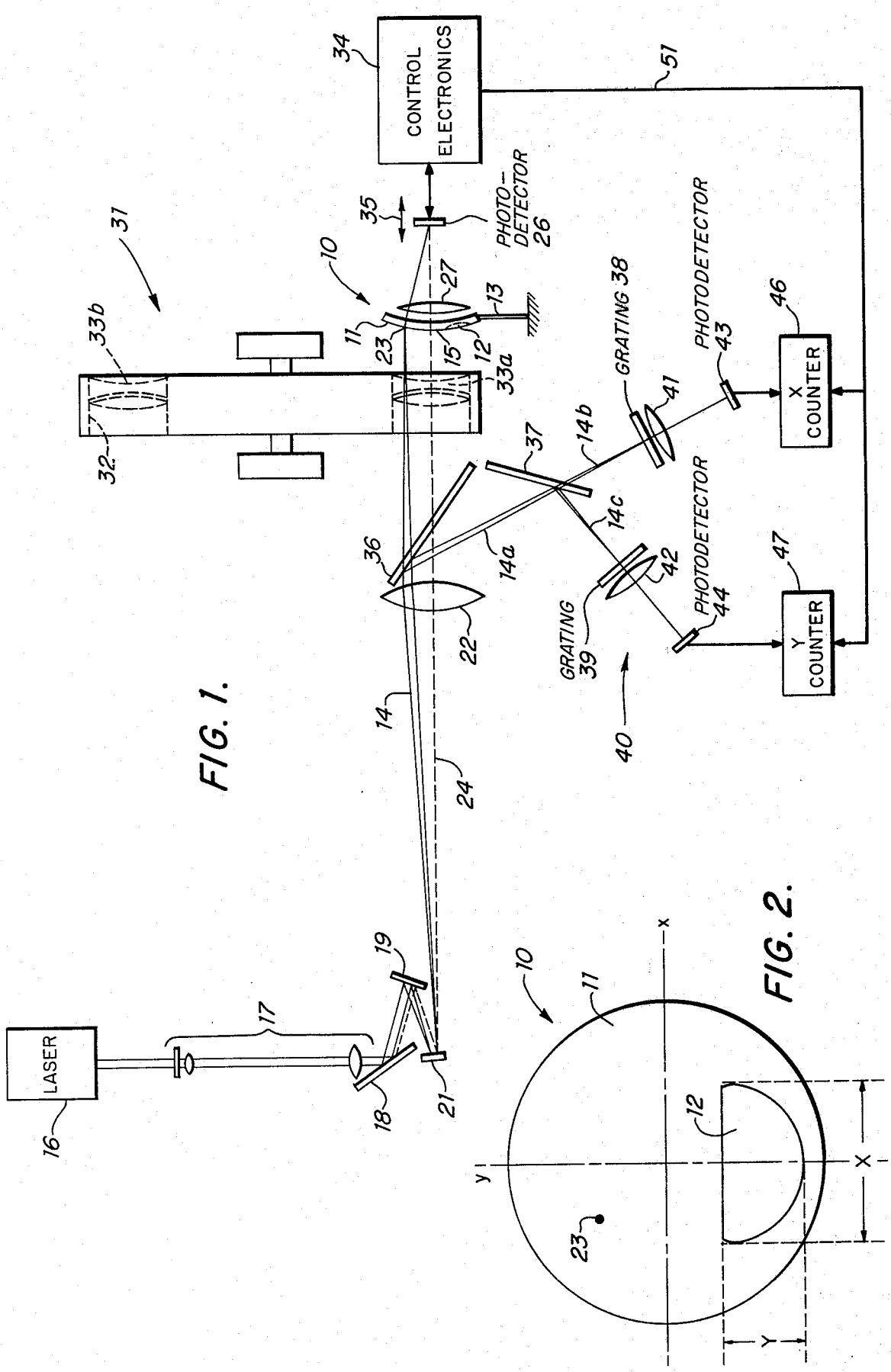

3,877,788

METHOD AND APPARATUS FOR TESTING LENSES

BACKGROUND OF THE INVENTION

1. Field of the Invention

The present invention relates generally to the testing of optical components and, more particularly, to a method and apparatus for investigating various characteristics of ophthalmic lenses of both the single vision and multifocal type.

2. Description of the Prior Art

During or after their manufacture, ophthalmic lenses are conventionally subjected to a series of tests to ensure that they meet certain minimum standards of size, shape and quality. For example, bifocal lenses are generally tested to ensure that their segment add powers are within acceptable tolerances. Also, the dimensions of the segments have to be measured so that two lenses may be properly matched for use in a pair of spectacles. Other parameters such as power variations across the lens surface or segment position are often examined as well.

At the present time, different types of techniques and structures are employed to perform each of these varied tests. For example, to measure the segment add power of a bifocal lens, one conventional practice is to view an object through both the distance and reading portions of the lens to determine the two object positions which give an in-focus image through each lens portion. By then measuring the distance between these two object positions, the add-on power of the bifocal segment may be calculated. This procedure is generally performed by viewing the object visually with a vertometer and, as a result, is not particularly accurate. Also, it requires the use of skilled personnel and is not readily susceptible to automation.

In order to measure the dimensions of a bifocal segment, a substantially different technique is usually performed. More particularly, an image of the lens is projected onto a scaled screen, and the dimensions of the segment image is then read directly off the screen. Again, this procedure requires a substantial amount of personnel involvement and is not very accurate or efficient.

To perform many other types of tests fully suitable apparatus is simply not available, and there is no single apparatus that is capable of performing all of these varied tests in a substantially automatic manner.

SUMMARY OF A PREFERRED EMBODIMENT OF THE INVENTION

In accordance with the present invention a system is provided which is capable of automatically performing a large variety of separate tests on a lens and which may be rapidly and easily adjusted for the particular type of test to be performed. In accordance with a preferred embodiment of the present invention, structure is provided for passing a very narrow beam of light through selected areas of the lens under examination in a prescribed manner as opposed to conventional apparatus which illuminates the entire aperture of the lens. This narrow beam of light, upon passing through the lens, will be bent or deflected in proportion to the refractive power of that small area of the lens through which it passes and is then brought through the lens focus onto a suitable photosensitive detector which can, through appropriate electronics and controls indicate the extent to which the beam has been deflected by the lens, and hence, provide a measure of the refractive power of that lens area.

From this basic concept a variety of tests may readily be carried out. For example, to measure the segment add power of a bifocal lens, the beam of light is first passed through the distance portion of the lens to determine the effect of that portion of the lens on the beam. Thereafter, the beam is passed through the reading portion of the lens to again determine how the beam is affected. By automatically comparing the difference between the deflection of beams through the two lens portions, the add-on power of the segment can be automatically determined.

To measure the dimensions of a bifocal segment, the beam of light is scanned across the lens and the photodetector is employed to detect the instant at which there is an abrupt shift in the direction of the beam indicating that the beam is crossing the interface between the distance and reading portions of the lens. A signal produced by the detector at that moment is then utilized to actuate a suitable counter which can very accurately measure the length or height of the segment.

In general, the present invention is able to perform tests such as the above in a substantially automatic manner and under production line conditions with a minimum of expert involvement. Furthermore, these tests can generally be performed faster and more accurately than by conventional techniques. Finally, since only a single system is needed to perform all of these tests, a variety of different testing apparatus is no longer required thus permitting a reduction in space and time requirements. Yet furher important features of the invention will be emphasized hereinafter along with a detailed description of the drawings.

BRIEF DESCRIPTION OF THE DRAWINGS

FIG. 1 illustrates, in schematic form, the lens testing apparatus in accordance with a preferred embodiment of the present invention.

FIG. 2 illustrates a feature of the apparatus of FIG. 1 in greater detail.

DETAILED DESCRIPTION OF THE PREFERRED EMBODIMENT

FIG. 1 illustrates apparatus in accordance with the present invention for performing any one of a variety of tests on ophthalmic lenses. As will be explained in greater detail hereinafter, only selected portions of the apparatus shown in FIG. 1 will be used at any given time depending upon the particular test to be performed and appropriate structure (not shown) may be provided in the system to move components in and out of operative position as needed.

In FIG. 1, reference number 10 identifies the lens to be tested. This lens may be of the single vision or multifocal type and may have either concave or convex surfaces as recognized by those skilled in the art. In the following description, the lens will be considered to be a bifocal lens having a distance portion 11 and a reading portion or segment 12 as shown more clearly in FIG. 2. Lens 10 is supported in the system by appropriate support structure schematically illustrated at 13 and is adapted to be positioned in the path of a narrow beam of light 14 preferably originating from a laser source 16. More specifically, the laser beam is directed through the lens under test along an optical path which includes a beam expanding optical system 17, a deflection mirror 18, X and Y scanning mirrors 19 and 21, respectively, and a collimating lens 22 as well as other appropriate structure depending upon the particular type of measurement or test to be performed as will be explained hereinafter. The beam expanding optical system 17 essentially consists of a series of lenses designed to bring the laser beam to a focus on the front surface 15 of the test lens 10, such that the beam, when it impinges on the lens surface, e.g., on area 23 in FIGS. 1 and 2, will have as small a cross-sectional diameter as is practically possible. In the preferred system, in fact, the beam has a diameter of approximately 1/16 of a millimeter (although in some applications it may be desirable to broaden the beam somewhat to alleviate the effects of dust praticles on the lens) and as such can essentially be treated as a light ray or, at least, a very narrow pencil of rays. This is an important feature of the invention as will become evident hereinafter.

X and Y scanning mirrors 19 and 21 are provided in the system to "steer" the beam 14 independently in the X and Y directions (FIG. 2) and may be used to scan the beam across the lens surface to provide, in effect, an infinite number of separate light beams, or alternatively, to direct it to precise locations on the lens. The structure for moving mirrors 19 and 21 are not shown but may be of conventional type. Other structure such as electro-optic deflectors could also be employed in place of the mirrors if desired.

Collimating lens 2 is included in the system to present the beam or ray 14 to lens surface 15 parallel to the optical axis 24 of the optical system. More particularly, collimating lens 22 does not collimate beam 14 itself, as that beam is brought to a focus on the lens surface, but instead ensures that all beams impinging on lens 10 whether by scanning or shifting are parallel to each other and to the optical axis. This is done by positioning the scanning mirror 21 a distance from collimating lens 22 equal to the focal length of that lens as is understood in the art and by doing this, the system is simpler in construction and fewer variables must be accounted for in the testing procedures.

Thus, in summary, the system so far described is capable of presenting a very narrow beam or ray of light to a specific location or series of locations on lens 10 to permit a series of tests to be performed. Light beam 14, upon passing through lens 10 is bent or deflected thereby in proportion to the refractive properties of the specific area of the lens through which it passes (any prism in the lens would also affect the beam deflection, however, this may be readily accounted for). This deflected beam then impinges upon a quadrant detector 26 or other photosensitive detector which generates appropriate signals in accordance with the position of the light striking it. By then monitoring these signals, any one of a number of tests may be performed as explained hereinafter. An additional lens 27 positioned behind the test lens 10 may also be provided to cause the beam 14 to converge more rapidly toward the optical axis 24 in order to conserve space and also to ensure that the beam impinges on the quadrant detector in these situations where the beam would otherwise diverge away from axis 24 after passing through lens 10.

In order to understand how the system of FIG. 1 might be used, a typical test procedure will now be described, and, in particular, that of determining the segment add power of bifocal lens 10 which may be defined as the difference between the power of the lens to light passing through the bifocal or reading portion 12 and to light passing through the distance portion 11. Furthermore, we will assume that lens 10 comprises a manufactured bifocal lens wherein the add power is supposed to be +2 diopters and that we wish to test it to ensure that it is accurate or at least within acceptable tolerances. This may be done as follows:

Initially, the lens under test is inserted into holder 13. Also, a wheel 31 of compensating lenses is inserted into the system. Wheel 31 comprises a disc having a plurality of apertures 32 positioned around its periphery within most of which are inserted a series of lenses or lens systems 33a, 33b, etc. (only two being shown in FIG. 1). More particularly, lenses 33 are selected to provide a series of lenses having effective powers which differ from one another in, for example, one-quarter diopter steps, to correspond to the conventional segment add powers usually manufactured. One or more of the apertures 32 are also preferably left empty. From this wheel, the particular lens 33a is selected which has an effective power which is equivalent to the expected segment add power of +2 diopters and by rotating wheel 31, the lens 32a is inserted into the system as shown. It should be understood that lens 33a will not have a power to exactly +2 diopters because of the fact that it is spaced a slight distance from the test lens, however, its power is such that the beam of light, upon passing through it and the distance portion 11 of lens 10 (FIG. 2) will be bent by the lens combination exactly the same as if the beam were passed only through the reading portion 12 of lens 10 (if, in fact, the segment add power is truly +2 diopters). This is essentially what is done. X and/or Y scanning mirrors 19 and 21 are first aligned to scan beam 14 such that it will pass through both lens 33a and an area in the distance portion 11 of lens 10 and then through lens system 27 onto quadrant detector 26. The quadrant detector is a conventional photosensitive device which generates signals proportional to the position where light strikes it and these signals are fed to suitable well known prior art control and measuring electronics circuitry 34 which is adapted to control various portions of the system. In this test, as the beam is scanned across the lens, the detector will generate an a.c. signal that will have a magnitude proportional to the distance that the detector is out of focus and a phase dependent on its direction out of focus, and circuitry 34 is employed to actuate a suitable prior art servo system (not shown) to cause the detector 26 to move backward or forward along optical axis 24 as shown by arrows 35 until the impinging beam 14 becomes centered on the detector such that there will be a zero output from the detector. When this occurs, the detector will be positioned in the focal plane of the lens system including lenses 33a and 27 and the distance portion 11 of lens 10 and this position will thus provide an indication of the power of lens portion 11 (since power in diopters equals 1/focal length in meters). The particular area of distance portion 11 through which beam 14 passes is not critical (except for possible lens aberrations) since any and all beams directed to lens 10 will be parallel to the optical axis 24 because of collimator 22, and accordingly, all beams will come to the focal point of lens 10.

Lens 33a is then removed from the system (preferably by rotating wheel 31 until an empty aperture 32 is positioned in the optical system). Thereafter, beam 14 is shifted by mirrors 19 and/or 21 so as to direct it through an area in the reading portion 12 of lens 10 (or, alternatively, the lens is shifted). If segment 12 is in fact, a +2 diopter segment, the light beam after passing through it and lens 27 should impinge upon the detector 26 at precisely the same spot as before and the detector should again have a zero output. If there is, in fact, a zero output from the quadrant detector, or, at most, an output indicating only a small error that is within acceptable tolerances, we know that the bifocal segment has an add power of +2 diopters and that the lens is acceptable.

As an alternative to the above procedure, the ring of compensating lenses may be eliminated, and instead, the beam 14 is sequentially passed directly through both the distance and reading portions of the lens 10 and onto the quadrant detector and the quadrant detector moved until zero outputs exist for both beams. In this procedure, the distance between the two quadrant detector positions would be equal to the difference in focal length between the two lens portions and, hence, their power difference could be calculated. The procedure employing the compensating lenses is preferred, however, because it is better suited for automatic operation, and, since a large number of identical lenses will generally be tested in an operation, fewer movements and stresses will be placed on the system.

Let us now assume that we wish to perform a different type of test on lens 10, i.e., that of measuring the maximum vertical and horizontal dimensions of the bifocal segment 12. This may readily be done utilizing the apparatus as follows:

Initially, wheel 31 is not needed for this test and is taken out of the optical system either by entirely removing the wheel or by simply rotating it to a position wherein it will not interfere with the light beam. Also, a counting system generally identified by reference number 40 (this system was not employed in the previous operation) is inserted into the system as shown in FIG. 1. This is done by using partially reflecting mirror 36 in the position shown to cause part of the light from beam 14 (beam 14a) to be reflected onto beam splitter 37. Beam splitter 37, in turn, splits beam 14a into beam 14b directed through an X oriented grating 38, and beam 14c directed through a Y oriented grating 39. Positioned behind gratings 38 and 39 are a pair of lenses 41 and 42, respectively, to collect the transmitted light onto a pair of photodetectors 43 and 44. Photodetectors 43 and 44 are, in turn, coupled to counters 46 and 47 as shown.

As mentioned previously, beam 14 was adjusted by means of beam expanding optical system 17 to have a cross-sectional diameter of approximately 1/16 of a millimeter when it impinges on lens surface 15. Similarly, gratings 38 and 39 are also spaced from beam expanding optical system 17 such that the beam will also come to a focus on the gratings with the same diameter and the gratings are constructed to have transparent rulings spaced approximately ⅛ of a millimeter apart, for a reason to be explained.

In order to measure the X-dimension of segment 12, X scanning mirror 19 is caused to continuously scan the beam 14 back and forth across the lens 10 in the X direction as illustrated in FIG. 2. At the end of each scan, the beam is stepped down on the lens by a very short distance by Y-scanning mirror 21, e.g., 1/16 mm, such that the beam will eventually be scanned across the entire lens surface. As the beam is scanned across the lens, its position is monitored by quadrant detector 26. Detector 26 is preferably positioned in the focal plane of the reading portion 12 of lens 10 and centered on optical axis 14 so that as long as the beam is scanning across the reading portion of lens 10, the beam will impinge on detector 26 at the focal point of reading portion 12 (as altered by lens system 27) and the detector will have a zero a.c. output. At some instant, however, the scanning beam will cross the interface between the reading and distance portions of the lens, and because of the difference in the refractive properties of those two portions of the lens, the refracted light beam 14 will abruptly jump as it crosses the interface. This will cause the beam to hit photodetector 26 at a different location producing a sharp discontinuity in the output signal. This signal will actuate X-counter 46 through coupling 51.

As beam 14 is scanned across lens 10, beam 14b is simultaneously scanned across X oriented grating 38 due to beam splitters 36 and 37 and since the diameter of beam 14b is 1/16 millimeter and the grating spacing is ⅛ millimeter, photodetector 43 will see periodic pulses of light as the beam scans across the alternating opaque and transparent rulings on the grating. These light pulses are countd by X-counter 46 and, as is evident, each pulse will represent a scan distance of ⅛ of a millimeter. The counter starts to count when it is turned on through coupling 51 at the instant that the beam enters the reading segment and continues to count until beam 14 encounters the opposite end of the reading segment whereupon there will be another sudden shift in the beam deflection which will be detected by quadrant detector 26 and which will turn off the counter. Therefore, by simply counting the number of light pulses received by photodetector 43 and multiplying that number by ⅛ of a millimeter, we are provided with the width of the segment in millimeters along a particular scan. The particular scan which produces the maximum number of pulses will represent the maximum width of segment 12 or the distance X in FIG. 2. By appropriate electronics these pulses may actually be broken down into four parts to provide accuracy to 1/32 mm.

In order to determine the maximum dimension of the segment in the y direction the same process is repeated except that the Y scanning mirror 21 is employed to scan the beam across the lens and Y-counter 47 coupled to Y photodetector 44 aligned to detect pulses seen through Y oriented grating 39 is employed to do the counting.

From the above descriptions it should be evident that this same apparatus can readily be adapted to perform a wide variety of other testing and measuring operations. For example, by employing essentially the same technique as used to measure the dimensions of a segment, the dimensions of a cut and shaped lens may be determined. Also, by merely scanning across a lens with the beam of light and monitoring the deflection of the beam during the scan, information can be obtained relative to the power variations of the lens over its surface.

Perhaps a basic feature of all of these tests is that the system employs a very narrow beam of light approximating a light ray to examine the lens one area at a time as distinguished from most conventional testing structure which examines how an object viewed through the lens is affected by the lens. By employing this narrow beam or ray of light, we are able to not only perform all of these tests but we can also eliminate the need for operator assistance and human judgement. Essentially, the entire test procedures may be done automatically as has been described. Thus the system can be readily incorporated into a lens manufacturing operation as part of the production line, and savings can be realized in both personnel and space.

While a preferred embodiment of the invention has been described, the teachings of this invention will readily suggest many other embodiments to those skilled in the art. For example, rather than providing a single light beam directed by means of scanning mirrors, an array of individually controlled separate light sources may be employed. Similarly an array of photosensitive detectors may be utilized in place of a single quadrant detector. Accordingly, it should be understood that numerous alterations, omissions, and additions may be made without departing from the spirit thereof and the invention should be limited only as required by the scope of the following claims.

We claim:
1. Apparatus for testing multifocal lenses comprising:
   a. means for supporting a multifocal lens in position to be tested, said lens having at least first and second portions of different refractive power;
   b. means for forming a light beam(s) having a cross-sectional diameter equal to a fraction of the surface area of said lens;
   c. means for directing said light beam through an area in each of said first and second lens portions;
   d. means for detecting said light beam after passing through each of said first and second lens portions and for producing signals indicative of the amount by which said light beam is deflected as a result of passing through each of said lens portions, the amount of said deflection being a function of the refractive power of said first and second lens portions; and
   e. means responsive to said signals for monitoring the amounts by which said light beam is deflected as a result of passing through said first and second lens portions and, hence, for monitoring differences in the refractive powers of said first and second lens portions for measuring a selected property of said lens.

2. Apparatus as recited in claim 1 wherein said detecting means comprises photosensitive detecting means.

3. Apparatus as recited in claim 1 wherein said light beam directing means comprises means for independently steering said beam across the front surface of said lens in first and second orthogonal directions.

4. Apparatus as recited in claim 3 wherein said steering means comprises first and second mirror means for independently scanning said beam across the surface of said lens in said first and second orthogonal directions.

5. Apparatus as recited in claim 1 wherein said light beam forming means includes means for bringing said light beam to a focus proximate the front surface of said lens.

6. Apparatus as recited in claim 1 wherein:
   a. said lens to be tested comprises a multifocal lens having at least first and second portions of different refractive power;
   b. said selected property to be tested comprises the difference in refractive power between said first and second portions;
   c. said light beam directing means comprises means for passing said light beam through an area in each of said first and second lens portions; and
   d. said signal responsive means comprises means for determining any differences in the amounts in which said beam has been deflected as a result of passing through each of said first and second portions of said lens, the difference in the refractive power between said first and second lens portions being a function of said deflection difference.

7. Apparatus as set forth in claim 6 wherein said multifocal lens comprises a lens manufactured to have first and second portions whose refractive powers differ from one another by an expected amount and wherein said apparatus further includes:
   a. a compensating lens system having an effective refractive power equal to the expected refractive power difference between said first and second lens portions;
   b. means for positioning said compensating lens system in the path of said light beam; and wherein
   c. said light beam directing means comprises means for passing said light beam through both said compensating lens system and said first lens portion to be deflected thereby, and means for passing said light beam through said second lens portion to be deflected thereby; and
   d. said signal responsive means comprises means for comparing the deflection of said beam upon passing through both said compensating lens system and said first lens portion with the deflection of said beam upon passing through said second lens portion and for producing a signal indicating a difference therebetween, said difference indicating that the refractive powers of said first and second lens portions do not differ by said expected amount.

8. Apparatus as recited in claim 7 wherein said compensating lens system positioning means comprises means for supporting a series of compensating lens systems, the refractive powers of each of the compensating lens systems in said series differing from one another by prescribed amounts, and further including means for selectively inserting the compensating lens system corresponding to the expected refractive power difference into operative position.

9. Apparauts as recited in claim 8 wherein said compensating lens system support means comprises a wheel having said series of lens systems positioned around the periphery thereof.

10. Apparatus as recited in claim 1 wherein:
   a. said lens to be tested comprises a multifocal lens having at least first and second portions of different refractive power;
   b. said selected property to be tested comprises a dimension of said second lens portion; and wherein
   c. said light beam directing means comprises means for scanning said light beam across the surface of said lens in the direction of said dimension to be measured;
   d. said light beam detecting means comprises means for detecting an abrupt change in the amount of deflection of said beam indicating that said beam has passed from said first lens portion to said second lens portion; and e. wherein said apparatus further includes means for monitoring the distance that said beam scans across said second portion.

11. Apparatus as recited in claim 10 wherein said monitoring means comprises counter means.

12. Apparatus as recited in claim 11 wherein said counter means comprises:
   a. beam splitting means for splitting said scanning light beam into a first scanning beam directed through said lens to be tested and a second scanning beam;
   b. grating means positioned in the path of said second scanning beam, said grating means having a plurality of spaced transparent rulings thereon aligned perpendicular to the direction of scan of said second scanning beam;
   c. pulse receiving means positioned behind said grating means for receiving pulses of light passing through said transparent rulings as said second scanning beam scans across said grating; and
   d. means for counting said pulses to provide a measure of said dimension of said second lens portion.

13. Apparatus as recited in claim 12 wherein the spacing between said transparent rulings are selected to be substantially twice the cross-sectional diameter of said second scanning beam.

14. Apparatus as recited in claim 13 wherein said light beam detecting means includes means for initiating said counting means at the instant in which said abrupt change in deflection is detected and for disabling said counting means when a second abrupt change in the deflection of said first scanning beam is detected indicating that said first scanning beam has passed out of said second lens portion.

15. Apparatus as recited in claim 10 wherein said counter means further includes means for measuring a second dimension of said second lens portion orthogonal to said first dimension.

16. A method for testing a selected property of a lens multifocal having a first lens portion of a first refractive power and a second lens portion of a second refractive power, said method comprising:
   a. directing a first narrow beam of light through said first portion of said lens to be tested;
   b. detecting said first beam of light after passing through said first portion and after being refracted thereby and generating a first signal indicative of the refractive power of said first lens portion;
   c. directing a second narrow beam of light through said second portion of said lens to be tested;
   d. detecting said second beam of light after passing through said second portion after being refracted thereby and generating a second signal indicative of the refractive power of said second lens portion; and
   e. comparing said first and second signals to identify differences in the refractive power therebetween to test said selected lens property.

17. A method as recited in claim 16 in which said lens comprises a multifocal lens having a first lens portion of a first refractive power and a second lens portion of a second refractive power, and in which said selected property to be tested comprises the difference between the refractive powers of said first and second lens portions, wherein:
   a. said first beam directing step comprises the step of directing said first beam of light through an area in said first lens portion;
   b. said second beam directing step comprises the step of directing said second beam through an area in said second lens portion; and
   c. said comparing step comprises the step of measuring said first and second signals and determining the difference therebetween.

18. A method as recited in claim 17 wherein said first and second beam directing steps comprise the steps of scanning said beam across said first and second lens portions respectively.

19. A method as recited in claim 16 in which said lens to be tested comprises a multifocal lens having a first lens portion of a first refractive power and a second lens portion of a second refractive power, said second lens portion being at least partially surrounded by said first lens portion, and in which said selected property comprises a dimension of said second lens portion; wherein:
   a. said first and second beam directing steps comprise the step of scanning a beam of light across said lens in the direction of said dimension to be measured;
   b. detecting said scanning beam after passing through said lens and being refracted thereby;
   c. generating a signal at the instant that said scanned beam abruptly jumps, said jump being indicative of said beam crossing an interface between said first and second lens portions; and
   d. measuring the scan distance of said beam in said second portion.

20. A method as recited in claim 19 and further including the step of generating a second signal when said scanning beam again abruptly jumps indicating that said beam has crossed from said second lens portion back to said first lens portion and terminating said dimension measuring at that time.

* * * * *